Sept. 19, 1939.   K. E. CROOKS ET AL   2,173,622
FACING AND METHOD OF SECURING THE SAME TO A SUPPORT
Filed Feb. 11, 1937
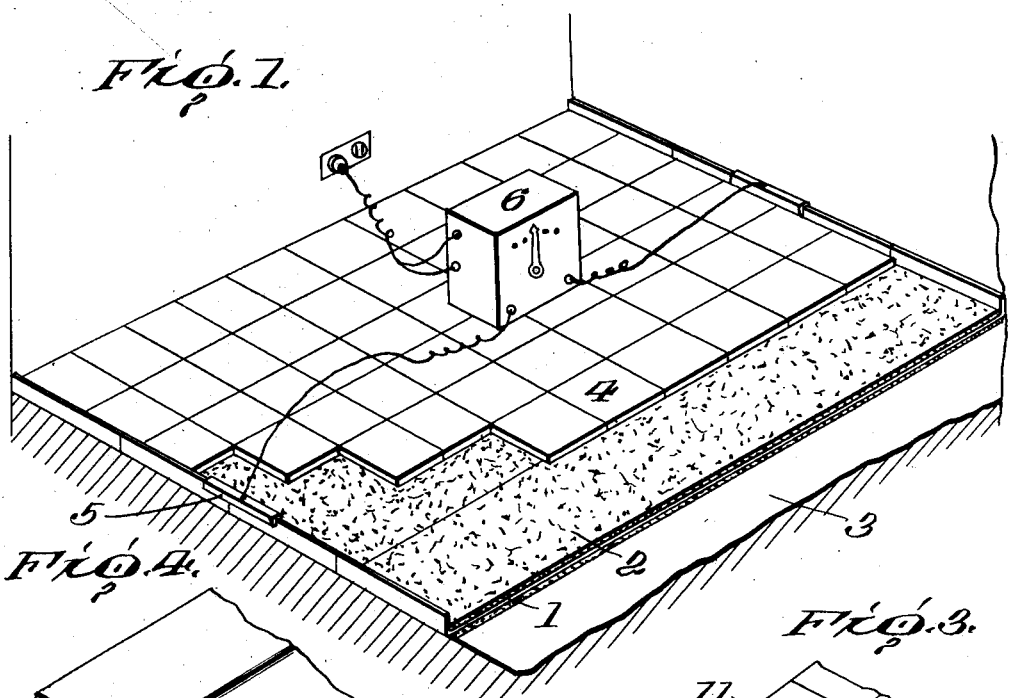
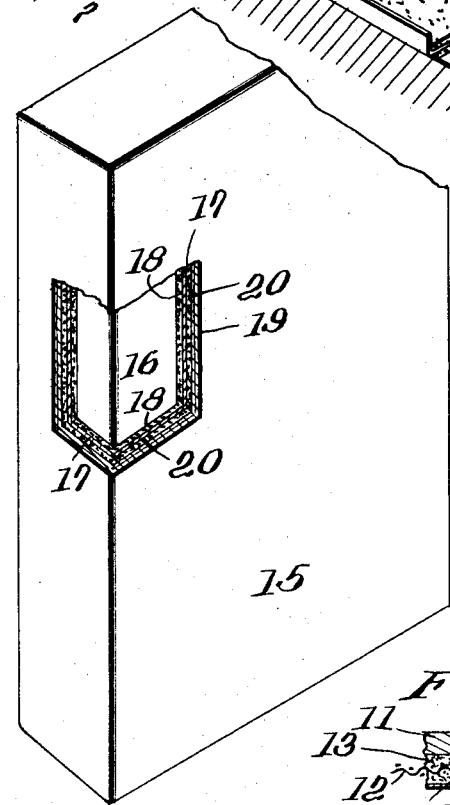
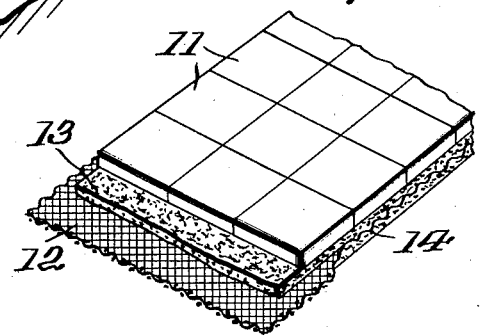
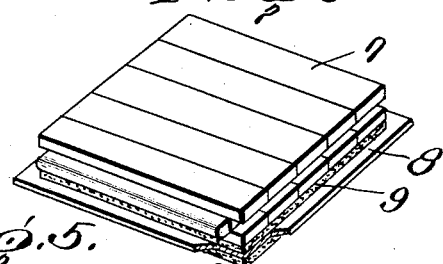
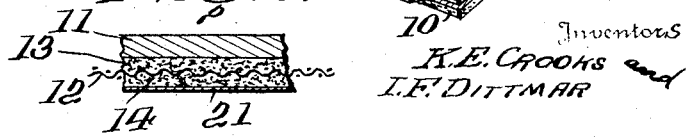
Inventors
K. E. Crooks and
I. F. Dittmar
By Pattison and Pattison
Attorneys Patented Sept. 19, 1939

2,173,622

UNITED STATES PATENT OFFICE 2,173,622

FACING AND METHOD OF SECURING THE SAME TO A SUPPORT

Kenneth E. Crooks and Irvin F. Dittmar, Williamsport, Pa.

Application February 11, 1937, Serial No. 125,298

14 Claims. (Cl. 94—22)

This invention relates to a facing and a method of securing the same to a support and is a companion application to our application filed December 18, 1936, Serial Number 116,604, the object being to utilize heat generated by electrical energy to volatilize or evaporate the volatile substances of an adhesive material used for securing two or more members together, whereby the setting of the adhesive material is accelerated so as to secure the members firmly together quickly, thereby overcoming the difficulties now existing of depending on atmospheric conditions to carry off the volatile substances of the adhesive material.

In carrying out our invention we utilize electrical energy to heat and volatilize the volatile substances from a relatively normally plastic adhesive material to change the characteristics of the adhesive material to cause the members to be more rigidly secured together, the object being to provide a method which allows the initial use of a normally plastic adhesive material in securing two or more members together to allow for the proper positioning of the members on an uneven surface and yet allow the members to be rigidly set quickly by changing the characteristics of the adhesive material from a normally plastic adhesive material to one which will set relatively hard in a very short time.

Our invention is particularly adapted for securing flooring units to a support with a normally plastic mastic which can be applied on the support or between the support and members or carried by the members to be secured to the support and has embedded therein or in contact therewith or in proximity thereto a resistance material to form a conductor of electric current in order to generate sufficient heat when electric current is passed therethrough to volatilize or partly volatilize the volatile substances of the adhesive material to increase the adhesiveness of the adhesive material to cause the same to more quickly and firmly secure the members together after being positioned.

Another way of carrying out our method is to apply at the factory to the inner face of the facing a normally plastic adhesive material protected if desired by any suitable means to prevent it from sticking in shipping and embed therein or arrange in close proximity thereto a resistance material which will extend outwardly beyond the edges of the facing so as to overlap and make electrical contact with the outwardly extending portions of the resistance material of the adjacent facing whereby the facing could be laid on or against a support and electric current passed through the resistance material to dry the adhesive material to quickly secure the facing to the support.

Another way of carrying out our invention of securing a facing to a support is to arrange sheets of adhesive material which may be reinforced by paper or fabric to each side of the resistance material and dry the adhesive material by passing an electric current through the resistance material to cause the facing to be quickly secured to a support.

Our invention consists broadly in securing two or more members together by quickly drying an adhesive material through the medium of a resistance material arranged in contact with the adhesive material and while we are aware that this can be accomplished in various ways, we do not wish to limit ourselves to any form of apparatus or any particular manner of carrying out the broad idea of quickly drying normally plastic adhesive material by passing an electric current through a resistance material for evaporating moisture and volatile substances.

The invention disclosed in this application is substantially the same in all respects to that disclosed in our companion application and utilizes a similar apparatus for carrying out a new method of securing two or more members together by a relatively normally plastic or tacky adhesive material by evaporating or volatilizing the volatile substances of the adhesive material to cause the material to set quickly and we wish it to be clearly understood that this method can be used with any and all of the disclosure of our companion application by substituting a relatively normally plastic or tacky adhesive material for what has been termed a relatively non-tacky adhesive material and this application is only filed to make a clear line of division between the two methods as applicants recognize the similarity of the two inventions as the moisture in and about the members to be secured together is removed by evaporation at the same time that the nature of the adhesive material is changed.

We have described in this application the removal of moisture from the members to be connected as well as the removal of the volatile substances of the adhesive material as moisture and solvents are expelled by the heat generated by the heating of the resistance material which when in foraminous form aids in venting the vapors produced by the drying of the adhesive material and the members to be connected.

Other and further objects and advantages of the invention will be hereinafter set forth and the novel features thereof defined by the appended claims.

In the drawing,

Figure 1 is a perspective view of a simple form of apparatus showing the method of securing a facing to a support;

Figure 2 is a perspective view of a facing element in the form of a block which is to be used for flooring having an adhesive material and a resistance material carried by the under side thereof;

Figure 3 is a perspective view of a sectional flooring composed of a plurality of sections arranged on a foraminous base of resistance material and secured thereto by adhesive material and which is also coated on its under side so that when heated by passing an electric current through the foraminous base, it will be quickly secured to a support;

Figure 4 is a detail perspective view, partly broken away, of a panel showing a core enveloped in a metal casing of resistance material coated with an adhesive material against which is arranged veneer so that when an electric current is passed through the envelope of resistance material and pressure is applied to the outer facing of veneer, the veneer will be secured to the resistance material and the resistance material to the core to form quickly a strong fireproof unit; and Figure 5 is a detail section showing means for protecting the normally plastic adhesive material to prevent it from sticking.

In the drawing we have illustrated a simple form of appartus for carrying out our invention for laying a flooring which consists in laying on a support 3 foraminous or solid sheets 1 of resistance material with a coating of normally plastic adhesive material 2, the edges of the sheets being preferably turned up adjacent the walls as shown. The flooring elements 4, either in strip, block or sheet form are then laid over the previously laid sheets of resistance material and after the flooring has been positioned an electric connection along the edges of the sheets is made by contact strip 5 with an electric apparatus 6 connected to a source of electrical energy so as to cause an electric current to pass through the resistance material to heat the same which will volatilize the volatile substances of the adhesive material and by applying pressure, if necessary, to the upper surface of the previously laid flooring, the flooring will be set and secured to the subfloor by the adhesion of the adhesive material very quickly and when the electric apparatus is disconnected, the flooring will be firmly set so that all danger in the future of the adhesive material being activated by ordinary temperature is prevented and we are able to lay a flooring in this manner very quickly without any danger of the flooring being discolored by the adhesive material used for binding the same to the subfloor working up between the flooring unit.

The above example and illustration of the carrying out of our invention by arranging on the subfloor normally plastic adhesive material carrying resistance material through which an electric current is passed for volatilizing the volatile substances of the adhesive material after the facing is in position thereon in order to bind the facing thereto is only given as one of the many ways that our method of securing a facing of any kind to a support by utilizing electrical energy for drying a relatively tacky adhesive material and therefore we do not wish to limit ourselves to any particular kind or form of normally plastic adhesive material, kind or form of resistance material, or any particular construction of apparatus for passing electric current through the resistance material.

While in Figure 1 we have illustrated a flooring formed of a plurality of blocks, we are aware that the members forming the flooring element can be formed of any shape desired and may be in the form of strips, blocks or sheets and that our invention is not limited to wood flooring as tile constructed of various material can be laid in accordance with our invention.

In Figure 2 of the drawing we have illustrated a wood block flooring element formed of a plurality of sections having tongues and grooves which are adapted to be interlocked with the adjacent flooring elements and we wish it to be clearly understood that this construction of block and the manner of interlocking the same forms no part of our invention as blocks can be employed without interlocking features and can carry a normally plastic adhesive material which can be protected by any suitable means, as for example Cellophane, oil paper or a powder so as to allow a block so constructed to be manufactured at the factory and shipped without the blocks adhering to one another.

To the under side of this block 7 we secure at the factory a sheet of resistance material 8 by adhesive material 9 which is coated on its under surface by adhesive material 10 and when these blocks are laid with their edges abutting one another, the outwardly extending portions of the sheet of resistance material will make electrical connection with the adjacent sheet of resistance material carried by the adjacent block so that when a plurality of these blocks are assembled to form a floor or the like, means is provided for making an electrical connection with any number of these blocks so that when a current of electricity passes through the resistance material, the adhesive material will be dried so that by applying pressure, if necessary, to the upper surface of the block it will be firmly set on the subfloor or support as the case may be and while we are aware that in the drying of the adhesive material on the under side of the resistance material, that the adhesive material on the upper surface of the resistance material which secures the resistance material to the block will be dried, this allows the adhesive material to be in a plastic state so that the blocks will quickly set themselves when pressure is applied so as to form a smooth and even surface of flooring. In this form of block we have illustrated a solid sheet of resistance material 8, but we are aware that this resistance material can be in any form for example, bars, sheets, or wire or particles to conduct the electric current.

In Figure 3 of the drawing we have illustrated a portion of a section of flooring composed of a plurality of blocks 11 arranged on a foraminous base 12 and secured thereon by adhesive material 13, which carries adhesive material 14 on its under surface so that when a section of flooring which has been manufactured at the factory, is laid on a support or against the same and an electric current is passed through the resistance material, the adhesive material will be dried in order to allow the section to be securely fastened to the support by the adhesive material and while in the drawing we have only shown a portion of a section so constructed, we do not wish to limit ourselves to any particular size of section nor to the shape or kind of facing forming the flooring elements carried by the base as we are aware that this construction of section could be formed of facing material either in strip, block, sheet or tile form without departing from the spirit of our invention.

This produces as a new article of manufacture, a facing element carrying a resistance material and an adhesive material which can be dried very quickly after the same has been positioned on the support to which it is to be secured by passing an electric current through the resistance material and while we have shown a simple form of facing with means for making an electric connection between the respective sections, we are aware that it is not essential that the resistance material be formed of a greater area than the facing as additional means could be employed for making an electric connection between the resistance material of one section and another without departing from the spirit of our invention.

In Figure 4 we have shown as a new article of manufacture a panel 15 consisting of a core 16 which is enveloped by a metallic casing of resistance material or the like 17 which has disposed between its inner face and the core a sheet of adhesive material 18 and between its outer face and the veneer facing 19 a sheet of adhesive material 20 and by passing an electric current through the resistance material, the adhesive material will be dried and by applying pressure to the outer facing of the veneer, a complete panel can be manufactured very cheaply.

In Figure 5 we have shown the normally plastic adhesive material protected by means 21 to prevent the same from sticking in shipping or when applying the facing element.

In the drawing and description thereof we have only illustrated and described a few ways of carrying out our method of securing a facing to a support, but we are aware that this method can be used in a great many arts where it is desired to secure a facing to a support by adhesive material and therefore we do not wish to limit ourselves to the nature of the facing or the nature of the support.

In the specification we have used the term "facing" generically to indicate a covering of any kind in strip, block or sheet form of any kind of material for building purposes, as for example, a facing for walls, ceiling and floor of a room or outside covering of a building, such as the roofing and wall facing or the production of an article of manufacture, as for example, doors, trim, columns, or articles of furniture. While our invention is particularly adapted for securing a facing to a support, we wish it to be clearly understood that the word "facing" does not necessarily mean an outer facing as our invention can be used for securing two or more members together whether said members form the outer facing or the interior portion of any structure.

In the specification we have used the term "resistance material" to indicate any kind or form of material which will offer a sufficient amount of resistance to the passing of an electric current to heat the adhesive material in order to dry the same so that the facing will be secured to the support after it has been applied thereto and this material may be in any form, for example, bars, sheets, wire or particles to conduct the electric current.

While in the specification we have set up several ways of carrying out our method of securing a facing to a support, we are aware that various other ways of using the broad principle of heat generated by electrical energy to dry the adhesive material can be used, and we do not wish to limit ourselves to the examples given in any way as our invention consists broadly in quickly drying an adhesive material by electrical energy for binding two or more members together whether metallic or non-metallic. As various forms of apparatuses for carrying out our invention can be used as the apparatus only consists of means for passing an electric current through a resistance material, we have only illustrated a simple form of apparatus for carrying out our method and while it may be possible to pass an electric current through an entire floor surface of a room, in some instances it may be advisable to only pass an electric current successively through sections of the surface area as the facing is laid, therefore we reserve the right to use electrical energy in the broadest possible way for drying the adhesive material for securing two or more members together used for any purpose desired.

In the specification we use the term "normally plastic adhesive material which is relatively tacky" to indicate an adhesive material which is plastic under normal atmospheric conditions and wish it to be clearly understood that we do not limit ourselves to any particular kind of adhesive material as the application of heat generated by the resistance material will be governed by the nature of the resistance material, the nature of the adhesive material and the time of the application of electrical energy so as to dry the adhesive material by volatilizing the volatile substances thereof.

While in the disclosure of carrying out our method to form a panel we have failed to show any means for venting the vapors generated by the heating of the resistance material, we wish it to be clearly understood in carrying out our invention in any of the various ways, means can be provided for venting the vapors driven off so as to allow the same to readily escape and when laying a flooring the use of a foraminous resistance material would allow the venting of the vapors and when a sectional facing element is employed, the vapors escape between the abutting edges of these elements.

This application is a companion application of our application filed December 18, 1936, and we have failed to describe all of the various examples and methods set up therein but the method described therein is capable of being used in all of the examples set up in our companion case.

In carrying out our method when using a metal support to which a facing element is adapted to be secured by adhesive material, we utilize a metal support as a resistance material through which we pass an electric current for changing the characteristics of the adhesive material so that the same is set quickly.

In all of the ways of carrying out our method we volatilize the volatile substances from a normally plastic adhesive material so as to increase the adhesiveness quickly as our method enables securing together two or more surfaces by normally plastic adhesive material in the matter of minutes or hours by the use of heat generated by passing electric current through a resistance material, thereby overcoming the difficulties now existing in the use of a normally plastic adhesive material.

While we have found that good results can be obtained with a resistance material for heating and drying the adhesive material which remains in its original condition after the electric current has passed therethrough, we are aware that a sufficiently high electric current could be passed through a specific kind of resistance material to volatilize or decompose the resistance element so that the gases and ash combine with the adhesive material either chemically or as a mechanical mixture or in the case of gases pass off and therefore we do not wish to limit ourselves to the nature of the resistance material so long as the resistance material will offer the required amount of resistance to generate sufficient heat to carry out the partly or wholly drying of the adhesive material.

In the specification and claims we have used the term "a relatively tacky adhesive material" to indicate an adhesive material which is sticky at the time of its application or has been made sticky after its application by a solvent which will be wholly or partly evaporated by the heat generated by the passing of an electric current through the resistance material so as to change the characteristics of the same to meet the desired requirement as the adhesive material may remain normally plastic or may become hard which will depend partly or wholly on the nature of the adhesive material and partly or wholly on the degree of heat and the time of its application and while we have selected the term "normally plastic adhesive material", this is used generically and our method is capable of being used with any and all kinds of adhesive material and cements to change the characteristics of the adhesive material and cement.

The adhesive material may be in dry form and moistened to make it tacky by adding water thereto and our invention consists broadly in evaporating the volatile substances from the adhesive material to make it set.

We claim:

1. The method of securing a facing to a support consisting in arranging between the support and facing a volatile adhesive material having a resistance material in proximity thereto and passing an electric current through the resistance material to volatilize the volatile substances of the adhesive material and evaporating the moisture from the facing, support and adhesive material.

2. The method of securing a facing to a support consisting in arranging between the support and facing a volatile adhesive material having resistance material in proximity therewith and passing an electric current through the resistance material to volatilize the volatile substances of the adhesive material to secure the facing to the support.

3. The method of securing a facing to a support consisting in applying a volatile adhesive material to the face of the support having a resistance material arranged in contact therewith, then positioning said facing on said support and then passing an electric current through said resistance material to volatilize the volatile substances of the adhesive material.

4. The method of securing a facing material to a support, consisting in disposing between the support and the facing material sheets of volatile adhesive material having a resistance material embedded therein and then volatilizing the volatile substances of the adhesive material by passing an electric current through the resistance material for securing the facing material to the support.

5. The method of securing facing material to a support consisting in arranging against the support a sectional facing material, each section having its inner face coated with a volatile adhesive material with a resistance material in close proximity thereto, the resistance material extending beyond the edges of the sections of the facing material to make an electric contact with the adjacent projecting resistance material of the adjacent facing section and then passing an electric current through the resistance material to volatilize the volatile substances in the adhesive material.

6. The method of laying flooring on a subfloor consisting in laying floor panels on a subfloor, each floor panel having volatile adhesive material carried by its under face with resistance material in close proximity thereto and projecting outwardly beyond the edges of the panels to overlap the outwardly projecting resistance material of the adjacent floor panel in order to form an electric contact between the resistance material of one panel with another and then passing an electric current through the resistance material to evaporate the volatile substances in the adhesive material carried by the panels and then applying pressure to the floor panels for setting and causing the adhesive material to bind the floor panels to the subfloor.

7. A facing having volatile adhesive material applied to one face thereof normally in sticky condition with means for protecting the same, said adhesive material having a resistance material arranged in contact therewith adapted to form a conductor for an electric current for volatilizing the volatile substances of the adhesive material.

8. The method of securing a facing to a support consisting in arranging facing material having a volatile adhesive material carried thereby with a resistance material in close proximity thereto against the support with the resistance material on one section of the facing in contact with the resistance material of the adjacent section of the facing to form an electrical connection between the resistance material of one section with another and then passing an electric current through the resistance material to dry the adhesive material.

9. A flooring composed of a flexible base formed of a resistance material having a plurality of flooring elements secured thereon by volatile adhesive material, the resistance material being adapted to dry the adhesive material when an electric current is passed therethrough.

10. The method of securing a facing to a support consisting in arranging a plurality of facing elements formed of resistance material on a support with their edges overlapping having volatile adhesive material arranged on their under faces and passing an electric current through said elements to dry the adhesive material for securing said elements together and said elements to the support.

11. The method of securing a facing to a support consisting in arranging a plurality of facing elements formed of resistance material on a support with their edges overlapping having volatile adhesive material arranged on their under faces and passing an electric current through said elements to dry the adhesive material and applying pressure to said elements for securing said elements together and said elements to the support.

12. The method of enclosing a body with a facing, consisting in first enveloping a body with a metallic-like resistance material having a coating of volatile adhesive material having a high melting point, second enveloping the resistance material with a facing, then passing an electric current through the resistance material to heat the same to dry the adhesive material and then applying pressure to the facing to secure the resistance material to the body and the facing to the resistance material.

13. The method of securing a facing to a metal support consisting in arranging between the support and facing volatile adhesive material having a high melting point and passing an electric current through the metal support for heating the same to dry the adhesive material for securing the facing to the support.

14. The method of securing a metal facing to a support consisting in arranging a plurality of facing elements having a coating of volatile adhesive material on a support with their edges in contact with one another, and passing an electric current through said facing elements to dry and volatilize the volatile substances of the adhesive material to secure said elements together and to the support.

KENNETH E. CROOKS.
IRVIN F. DITTMAR.